US008174719B2

(12) United States Patent
Gurr, Jr. et al.

(10) Patent No.: US 8,174,719 B2
(45) Date of Patent: May 8, 2012

(54) SYSTEMS AND METHODS FOR TESTING A PRINTER

(75) Inventors: Ronald M. Gurr, Jr., Pflgerville, TX (US); Sandeep Kumar Arya, Singapore (SG); Leong Mum Chong, Singapore (SG)

(73) Assignee: Dell Products L.P., Round Rock, TX (US)

( * ) Notice: Subject to any disclaimer, the term of this patent is extended or adjusted under 35 U.S.C. 154(b) by 839 days.

(21) Appl. No.: 12/260,678

(22) Filed: Oct. 29, 2008

(65) Prior Publication Data

US 2010/0103447 A1 Apr. 29, 2010

(51) Int. Cl.
*G06F 3/12* (2006.01)

(52) U.S. Cl. .......................... 358/1.15; 358/1.1; 358/1.9

(58) Field of Classification Search .................. 358/1.1, 358/1.15

See application file for complete search history.

(56) References Cited

U.S. PATENT DOCUMENTS 6,076,915 A * 6/2000 Gast et al. ...................... 347/19
6,411,324 B1 * 6/2002 Christiansen et al. ........ 347/248
6,782,495 B2 8/2004 Bernklau-Halvor ............ 714/44
6,912,071 B1 * 6/2005 Rasmussen et al. .......... 358/406
2002/0136579 A1 * 9/2002 Michel et al. ................... 400/74
2005/0286922 A1 * 12/2005 Oki ................................ 399/75

* cited by examiner

*Primary Examiner* — King Poon
*Assistant Examiner* — Iriana Cruz
(74) *Attorney, Agent, or Firm* — Baker Botts L.L.P.

(57) ABSTRACT

A method for testing skew in a printer includes receiving at a printer a request to print a test page, and in response to the request, printing a test page. The test page includes (a) a first symbol defining a first symbol boundary and (b) a second symbol sized smaller than the first symbol boundary such that the second symbol fits inside the first symbol boundary when the test page is folded. The relationship between the size of the first symbol boundary and the size of the second symbol corresponds to a predetermined acceptable amount of skew in the alignment of the first and second symbols on the test page.

16 Claims, 3 Drawing Sheets

SYSTEMS AND METHODS FOR TESTING A PRINTER

TECHNICAL FIELD

The present disclosure relates in general to printers, and more particularly to systems and methods for testing a printer.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include printers for printing documents or other data from the information handling systems. To diagnose errors or other problems with a printer, most printers have diagnostic pages stored in the printer's firmware for printing various information regarding printer configurations, print quality, printing alignment, toner quality or levels, etc. However, existing diagnostic pages and techniques are generally not user friendly and often make it difficult for a user (e.g., a customer) to diagnose a printer error. Moreover, each printer model (even for the same manufacturer) typically uses a different process for accessing and presenting the diagnostic information to the user.

SUMMARY

In accordance with one embodiment of the present disclosure, a method for testing skew in a printer includes receiving at a printer a request to print a test page and, in response to the request, printing a test page. The test page includes (a) a first symbol defining a first symbol boundary and (b) a second symbol sized smaller than the first symbol boundary such that the second symbol fits inside the first symbol boundary when the test page is folded. The relationship between the size of the first symbol boundary and the size of the second symbol corresponds to a predetermined acceptable amount of skew in the alignment of the first and second symbols on the test page.

In accordance with another embodiment of the present disclosure, a printer includes a processor, memory, and logic stored in the memory. The logic is operable to receive a request to print a test page and, in response to the request, print a test page. The test page includes (a) a first symbol defining a first symbol boundary and (b) a second symbol sized smaller than the first symbol boundary such that the second symbol fits inside the first symbol boundary when the test page is folded. The relationship between the size of the first symbol boundary and the size of the second symbol corresponds to a predetermined acceptable amount of skew in the alignment of the first and second symbols on the test page.

In accordance with another embodiment of the present disclosure, a printer includes a processor, memory, multiple print heads, and logic stored in the memory. The logic is operable to receive a request to print a test page and, in response to the request, print a test page. The test page includes at least two skew test images for testing the skew of the alignment of the test page passing through the printer; a print quality image for testing the print quality of the printer; one or more banding bars for testing the consistency of printing over an area; and a print head alignment image for checking the relative alignment of the multiple print heads.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
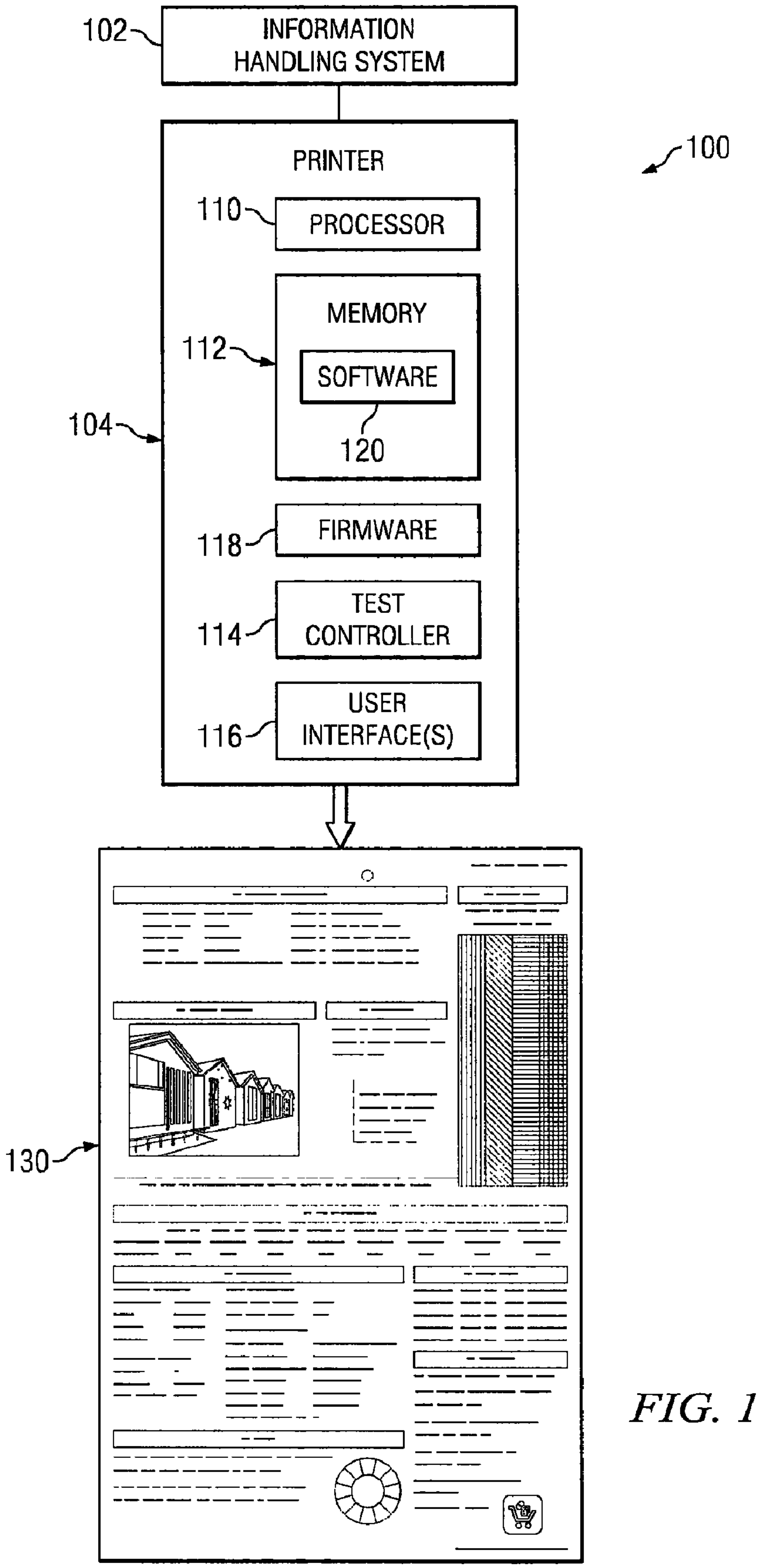
FIG. 1 illustrates a block diagram of an example system including an information handling system and a printer that provides testing capabilities, including printing a test page, in accordance with the present disclosure.
Figure 2:
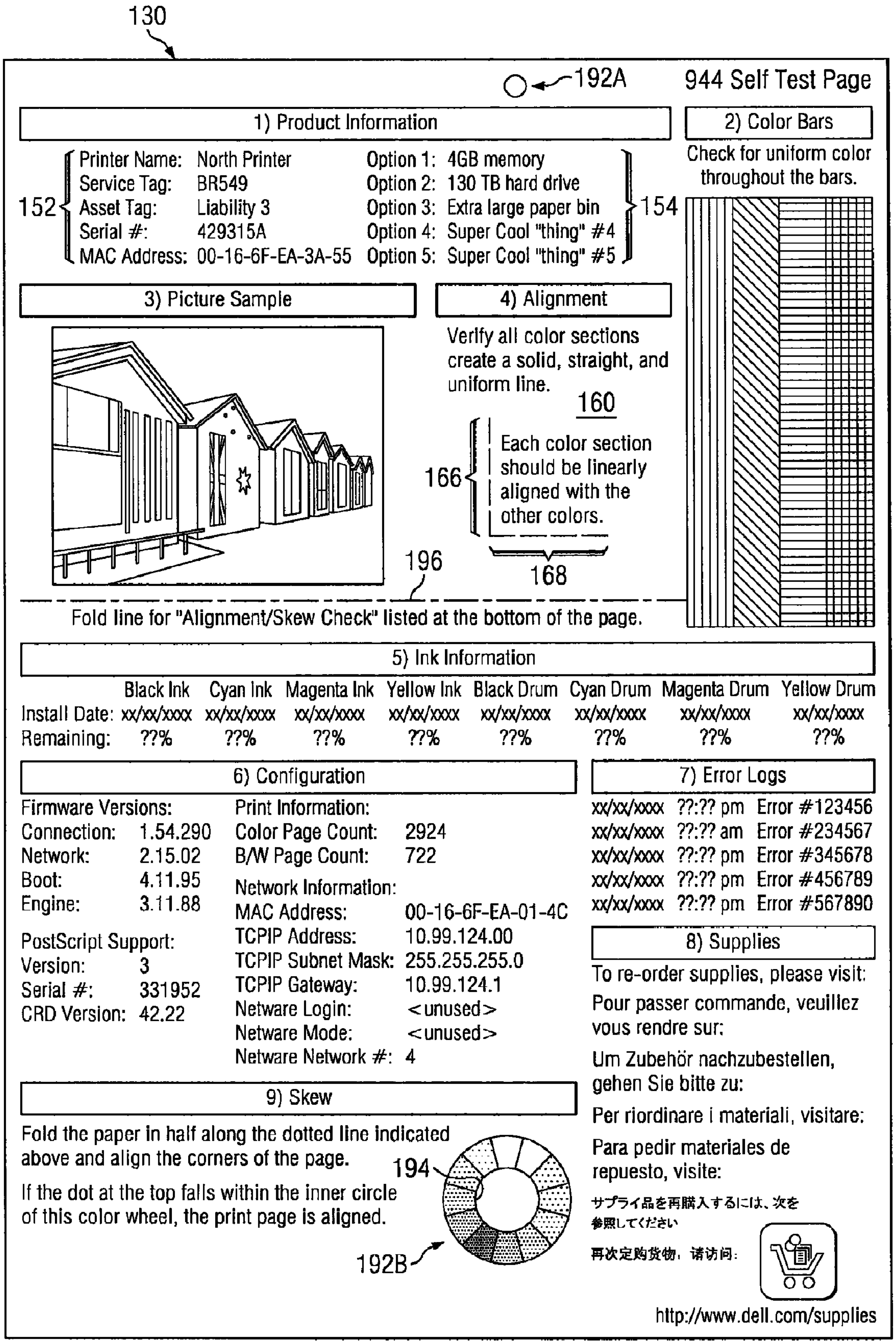
FIG. 2 illustrates an example test page for testing various aspects of the operation of a printer, according to one embodiment of the disclosure.
Figure 3:
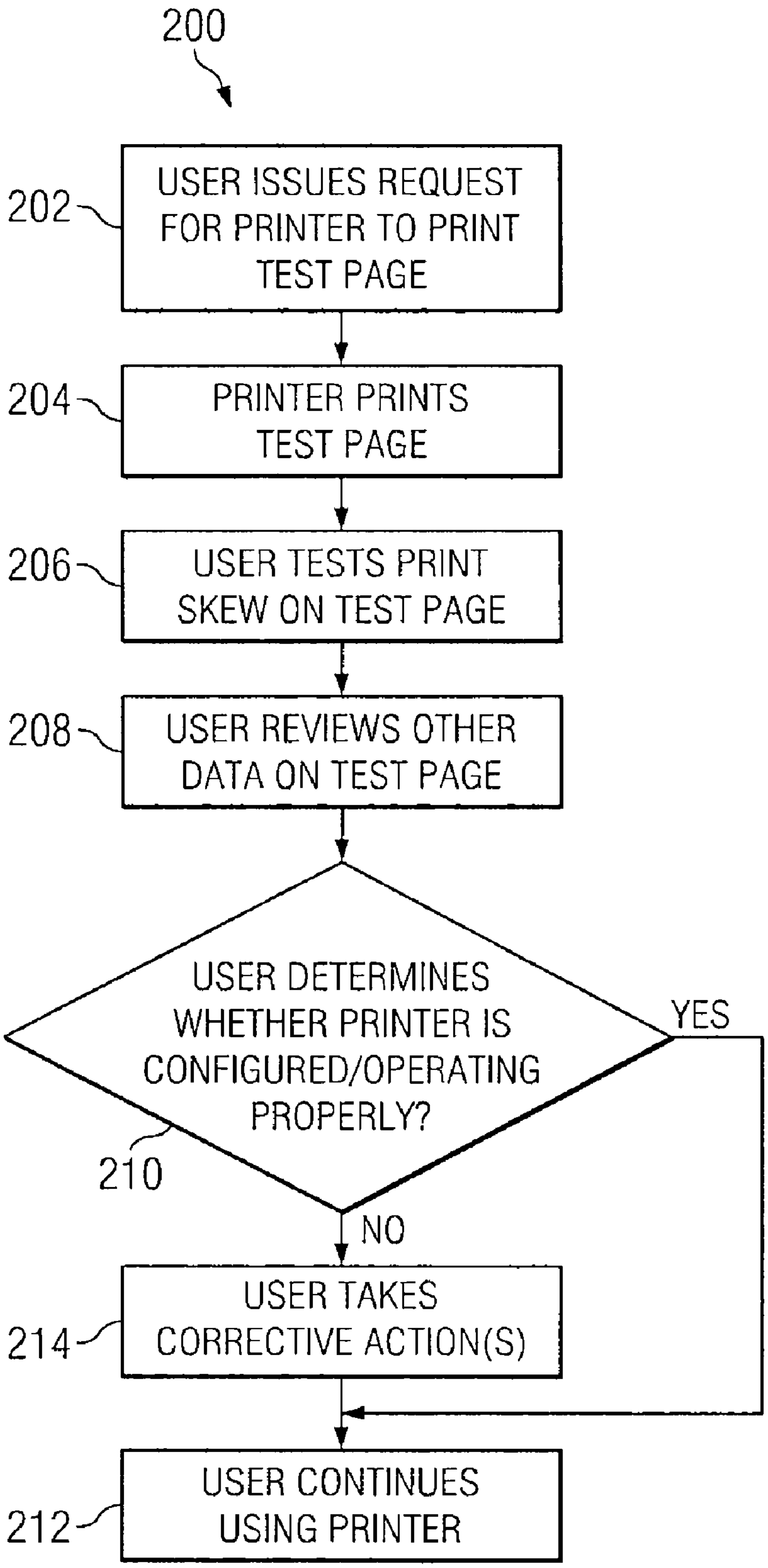
FIG. 3 illustrates an example method of using a test page for testing a printer, according to one embodiment of the disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example system 100 including an information handling system 102 and a printer 104 providing testing capabilities, in accordance with the present disclosure. Information handling system 102 may comprise any type of information handling system discussed herein. For example, in some embodiments, information handling system 102 may comprise a desktop computer, a laptop, a workstation, or a server.

Printer 104 may comprise a printing device for printing documents, images, or other data from information handling system 102. Printer 104 may comprise any known type of printing device, e.g., a laser printer, an inkjet printer, a photo printer, a dot matrix printer, or a plotter. Printer 104 may be a black and white printer or a color printer including any number of black and/or different colored ink cartridges or print heads.

Printer 104 may include any suitable electronics for receiving and processing print requests, as well as providing testing functionality. For example, printer 104 may include a processor 110, memory 112 communicatively coupled to processor 110, a test controller 114 communicatively coupled to processor 110, and a user interface 116. Printer 104 may also include firmware 118 and/or software 120 (which may be stored in memory 112) for providing various functionality of test controller 114.

Processor 110 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data, e.g., software 120 and/or firmware 118. In some embodiments, processor 110 may interpret and/or execute firmware 118 and/or software 120 to provide various functionality of test controller 114.

Memory 112 may be communicatively coupled to processor 110 and may comprise any system, device, or apparatus operable to retain program instructions or data (e.g., software 120) for a period of time. Memory 112 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to printer 104 is turned off. In some embodiments, firmware 118 may be stored in memory (e.g., flash memory). In other embodiments, firmware 118 may be stored in a hardware device, for example processor 110 (e.g., a microcontroller).

Test controller 114 may include any system, apparatus, or device operable to manage the testing of printer 104, including printing a test page 130 for testing the operation of printer 104. Test controller 114 may be implemented using hardware, firmware, software, or any combination thereof. For example, test controller 114 may include, or have access to, firmware 118 and/or software 120. Test controller 114 may cooperate with processor 110 and/or memory 112 in any suitable manner to provide the various functionality of test controller 114. Thus, test controller 114 may be communicatively coupled to processor 110 and/or memory 112 in any suitable manner. In some embodiments, processor 110 and/or memory 112 may be integrated with, or included in, test controller 114.

In some embodiments, test controller 114 may be configured to receive a request to print a test page (e.g., via user interface 116) and, in response to the request, print a test page 130 including various test data printed on the page, including, for example, any of the following test data:

A skew test, e.g., at least two skew test images for testing the skew of the alignment of the test page passing through the printer;

A folding line and an instruction to fold the test page along the folding line in order to align the skew test images;

A print quality image, or "picture sample," for testing the print quality of the printer;

One or more banding bars for testing the consistency of printing over an area;

A print head alignment image for checking the relative alignment of the multiple print heads;

Printer configuration data regarding the configuration of the printer; and/or

Ink/toner data regarding the current levels or ink or toner in the printer/particular cartridges.

An example test page 130 is shown in FIG. 2 and discussed below in greater detail. Some or all of the functionality of test controller 114 may be provided by firmware 118, software 120, or a combination of firmware 118 and software 120.

Firmware 118 may include any firmware operable, when executed by processor 110 or another processing device, to provide any or all of the various functionality of test controller 114 discussed herein. Firmware may be stored in memory 112, processor 110, or any other component of printer 104 (e.g., a microcontroller).

Software 120 may be stored in memory 112 or other computer-readable media, and may include any software operable, when executed by processor 110 or another processing device, to provide any or all of the various functionality of test controller 114 discussed herein.

User interface 116 may include any systems or devices for allowing a user to interact with system 100. For example, user interface 116 may include a graphic user interface and/or one or more physical controls, e.g., buttons, knobs, or switches. In some embodiments, user interface 116 may include multiple buttons, where a subset of such buttons (e.g., three buttons) may be pressed simultaneously to initiate a request to test controller 114 to print a test page. These buttons may be referred to as "hotkeys." Printer 104 may or may not identify the hotkeys to the user.

FIG. 2 illustrates an example test page 130 for testing various aspects of the operation of printer 104, according to one embodiment of the disclosure. Example test page 130 includes various test data and other printer-related data.

First, example test page 130 includes various product information regarding the printer. In this example, the product information includes a set of printer identification data 152 including Printer Name, Service Tag, Asset Tag, Serial #, and MAC Address. These items may be displayed for all printers, with "N/A" or other indication used for items that are not assigned for a particular printer. For example, a test page printed by a printer without Ethernet capabilities may read "MAC Address: N/A."

Product information may also include a list of "Options" 154 specific to the printer. The list of Options 154 may be dynamically-created (e.g., a printer having no installed options will not include any printed Options 154).

Second, example test page 130 includes banding bars, or color bars, for testing the consistency of ink over an area. Banding bars may include one or more color bar and/or one or more black and white bars. In one example, a four-color banding bar area is approximately 6 cm×10 cm and equally divided among the four colors. In another example, a black and white banding bar area includes four bars of 25%, 50%, 75%, and 100% black ink coverage.

Third, example test page 130 includes a print quality image, or picture sample for testing the print quality of the printer. The picture sample may be color or black and white.

Fourth, example test page 130 includes an alignment test 160, which may be specific to color printers. Alignment test 160 may display line segments (or other image) printed in each color supported by the printer in order to visually test the alignment of different print heads in one or more dimensions or directions. In this example, alignment test 160 displays a vertical array 166 of four different-colored line segments and a horizontal array 168 of four different-colored line segments, such that the vertical and horizontal alignment of the four colors supported by the example printer may be visually checked.

Fifth, example test page 130 includes ink information regarding the ink supported by the particular printer. Ink information may include, for example, data regarding the installation date and amount remaining (e.g., percent remaining) for each ink. The number of columns of ink information may vary depending on the number of colors supported and/or installed on the particular printer. As shown in the illustrated example, laser printers may include data regarding drum life.

Sixth, example test page 130 includes configuration data regarding the particular printer. Various items of configuration data may be displayed on test page 130 if applicable to the particular printer, but not displayed if not applicable to the particular printer. For example, for USB-only printers, the title "Network Information" and network information subheadings and data (MAC Address, TCPIP Address, etc.) may not appear on test page 130.

Seventh, example test page 130 includes an error log listing printing errors. For example, the error log may list the last 5 errors of the particular printer, including data such as the date, time, page count number, and/or error code for each error.

Eighth, example test page 130 includes supplies data instructing how to order supplies. Supplies data may be provided in multiple languages.

Ninth, example test page 130 includes a skew test for testing the alignment of test page 130 passing through the printer. In the illustrated example, the skew test includes a first symbol 192A located near the top of page 130, and a second symbol 192B located near the bottom of page 130.

First symbol 192A is a "dot" or circle, and second symbol 192B is a color wheel including the three primary colors and shades between the three primary colors. The inner perimeter of the color wheel defines a symbol boundary 194 of second symbol 192B. In another embodiment, the outer perimeter of the color wheel could define symbol boundary 194 of second symbol 192B.

The skew test also includes a folding line 196 and the instruction: "Fold line for 'Alignment/Skew Check' listed at the bottom of the page." A user may test the skew of the printed images on test page 130 by folding the page along folding line 196 (i.e., folding the page onto itself) and viewing the resulting alignment of first symbol 192A relative to second symbol 192B. For example, after folding test page 130 along folding line 196, the user may determine whether first symbol 192A falls completely within boundary 194 of second symbol 192B, falls partially within and partially outside boundary 194, or falls completely outside boundary 194.

The relative size of first symbol 192A and second symbol 192B (e.g., boundary 194 of second symbol 192B) may correspond to a predetermined acceptable amount of skew in the alignment of first and second symbols 192A, 192B printed on test page 130. For example, if an acceptable limit of skew for printed images is defined as 1% skew, the relative size of first symbol 192A and boundary 194 of second symbol 192B may be determined to correspond with a 1% printing skew. In such example, if after folding page 130 along line 196, first image 192A falls completely within boundary 194 of second symbol 192B, the printing skew on test page 130 is less than 1%, and thus deemed acceptable. Alternatively, if first image 192A falls at least partially outside of boundary 194 of second symbol 192B, the printing skew on test page 130 is greater than 1%, and thus deemed unacceptable.

The skew test may include any number of symbols 192 arranged in any pattern on test page 130. For example, the skew test may include a symbol 192 in each corner of test page 130 such that two symbols near the top of page 130 align with the other two symbols near the bottom of page 130 when the page 130 is folded in half. As another example, the skew test may include rows or groups of symbols 192 configured to align with each other when page 130 is folded.

Symbols 192 may include any suitable types of symbols, including for example, outlines or filled-in geometric shapes (circles, squares, ellipses, triangles, stars, etc.), portions of geometric shapes, icons, line segments, or any other types of symbols. Symbols configured to align with each other, e.g., symbols 192A and 192B, may be the same or different types of symbols. For example, symbols 192A and 192B may be the same or different shapes or icons. For example, symbols 192A and 192B could be two circles (e.g., such as in FIG. 2), a circle and a triangle, a cross and a square, or any other combination of symbols.

Symbols 192 may have any suitable sizes relative to each other. For example, as discuss above, the relative sizes of symbols 192A and 192B configured to align with each other upon folding of page 130 may correspond to a predetermined acceptable level of print skew.

In some embodiments, one symbol may have a dimension between 100% and 500% as large as a corresponding dimension of the opposing symbol. For example, a first circular symbol 192B may have a diameter that is 100% to 500% as large as the diameter of a second circular symbol 192A, wherein the skew test involves determining whether the smaller second circular symbol 192A falls within the larger first circular symbol 192B. For instance, in the illustrated example, the diameter of boundary 194 of symbol 192B may be approximately 250% as large as the diameter of symbol 192A.

Although folding line 196 in the illustrated example is a horizontal line dividing page 130 in half, folding line 196 may be aligned and positioned otherwise as desired. For example, folding line 196 may extend vertically (and symbols 192 may accordingly be located on the left and right sides of page 130), or diagonally across page 130. In some embodiments, page 130 may have multiple folding lines 196 and instructions for folding the page multiple times in order to test the alignment of symbols 192.

FIG. 3 illustrates an example method 200 of using a test page 130 for testing a printer 104, according to one embodiment of the disclosure.

At step 202, a user may issue a request for a printer 104 to print a test page 130, using user interface 116. For example, the user may issue a request for a test page by making a selection on a graphic user interface or by pressing one or more buttons on the printer 104 (e.g., by pressing three "test page hotkeys" simultaneously).

At step 204, test controller 114 (e.g., firmware 118 and/or software 120) may receive the request, and in response, print a test page 130, e.g., the example test page 130 shown in FIG. 2.

At step 206, the user may test the print skew on test page 130. For example, with reference to test page 130 shown in FIG. 2, the user may fold page 130 along the fold line 196 and check the alignment of symbol 192A within boundary 194 of symbol 192B. The user may hold the paper up to the light to help view the alignment of the symbols.

At step 208, the user may reviews various other test data (e.g., print head alignment and color bar test data) and/or other data printed on test page 130.

At step 210, the user may determine, e.g., based on the review of test page 130 at steps 206 and/or 208, whether the configuration and/or operation of the printer is acceptable. If so, the user may continue to use the printer without taking corrective actions, as indicated at step 212.

If not, the user may take any one or more corrective actions at step 214. Corrective actions may include, for example, checking and/or replacing one or more ink/toner cartridges, print heads, etc.; checking and/or updating a firmware version; checking and/or correcting connectivity of the printer; correcting the alignment or skew of the printer (e.g., manually or using software/firmware); addressing any errors in the error log; or checking and/or updating system configuration parameters. After taking the appropriate corrective actions, the user may continue to use the printer, as indicated at step 212.

Although the present disclosure has been described in detail, it should be understood that various changes, substitutions, and alterations can be made hereto without departing from the spirit and the scope of the disclosure as defined by the appended claims.

What is claimed is:

1. A method for testing skew in a printer, comprising:

receiving at a printer a request to print a test page; and in response to the request, printing a test page including (a) a first symbol defining a first symbol boundary and (b) a second symbol sized smaller than the first symbol boundary such that the second symbol fits inside the first symbol boundary when the test page is folded;

wherein the relationship between the size of the first symbol boundary and the size of the second symbol corresponds to a predetermined acceptable amount of skew in the alignment of the first and second symbols on the test page.

2. A method according to claim 1, wherein:

the first symbol boundary and the second symbol are sized such that if the first and second symbols are aligned on the test page with a predetermined acceptable amount of skew, the second symbol fits inside the first symbol boundary when the test page is folded along a centerline; and the first symbol boundary and the second symbol are sized such that if the first and second symbols are aligned on the test page with a predetermined unacceptable amount of skew, at least a portion of the second symbol does not fit inside the first symbol boundary when the test page is folded along the centerline.

3. A method according to claim 1, wherein:

the first symbol is located proximate a first end of the test page; and the second symbol is located proximate a second end of the test page generally opposite the first end of the test page.

4. A method according to claim 1, wherein:

the first symbol comprises a closed geometric shape; and the second symbol fits completely inside the closed geometric shape when the first and second symbols are aligned.

5. A method according to claim 1, wherein the test page further includes a folding line and an instruction to fold the test page along the folding line.

6. A method according to claim 1, wherein a dimension of the first symbol boundary is at least twice as large as a corresponding dimension of the second symbol.

7. A method according to claim 1, wherein the test page further includes a print quality image, one or more banding bars, and a print head alignment image.

8. A method according to claim 1, wherein the request to print a test page is received in response to multiple keys on the printer being pressed simultaneously, wherein the multiple keys are standardized across multiple printer vendors.

9. A printer, comprising:

a processor;

memory; and logic stored in the memory and executable by the processor to:

receive a request to print a test page; and in response to the request, print a test page including (a) a first symbol defining a first symbol boundary and (b) a second symbol sized smaller than the first symbol boundary such that the second symbol fits inside the first symbol boundary when the test page is folded;

wherein the relationship between the size of the first symbol boundary and the size of the second symbol corresponds to a predetermined acceptable amount of skew in the alignment of the first and second symbols on the test page.

10. A printer according to claim 9, wherein:

the first symbol boundary and the second symbol are sized such that if the first and second symbols are aligned on the test page with a predetermined acceptable amount of skew, the second symbol fits inside the first symbol boundary when the test page is folded along a centerline; and the first symbol boundary and the second symbol are sized such that if the first and second symbols are aligned on the test page with a predetermined unacceptable amount of skew, at least a portion of the second symbol does not fit inside the first symbol boundary when the test page is folded along the centerline.

11. A printer according to claim 9, wherein:

the first symbol is located proximate a first end of the test page; and the second symbol is located proximate a second end of the test page generally opposite the first end of the test page.

12. A printer according to claim 9, wherein:

the first symbol comprises a closed geometric shape; and the second symbol fits completely inside the closed geometric shape when the first and second symbols are aligned.

13. A printer according to claim 9, wherein the test page further includes a folding line and an instruction to fold the test page along the folding line.

14. A printer according to claim 9, wherein a dimension of the first symbol boundary is at least twice as large as a corresponding dimension of the second symbol.

15. A printer according to claim 9, wherein the test page further includes a print quality image, one or more banding bars, and a print head alignment image.

16. A printer according to claim 9, further comprising multiple keys operable, when pressed simultaneously, to issue the request to print the test page, wherein the multiple keys are standardized across multiple printer vendors.

* * * * *